United States Patent [19]

Higgins

[11] 3,929,500

[45] Dec. 30, 1975

[54] CHROME YELLOW PIGMENT WITH IMPROVED THERMAL STABILITY

[75] Inventor: James Francis Higgins, Livingston, N.J.

[73] Assignee: E. I. Du Pont de Nemours & Company, Wilmington, Del.

[22] Filed: Nov. 6, 1974

[21] Appl. No.: 521,524

[52] U.S. Cl. .............................. 106/298; 106/308 B
[51] Int. Cl.² ........................................... C09C 1/20
[58] Field of Search ...................... 106/298, 308 B

[56] References Cited
UNITED STATES PATENTS

| | | | |
|---|---|---|---|
| 2,808,339 | 10/1957 | Jackson | 106/298 |
| 3,370,971 | 2/1968 | Linton | 106/298 |
| 3,470,007 | 9/1969 | Linton | 106/298 |
| 3,639,133 | 2/1972 | Linton | 106/298 |

*Primary Examiner*—Winston A. Douglas
*Assistant Examiner*—J. V. Howard

[57] ABSTRACT

Chrome yellow pigment treated with from 0.2 to 18% of a boron compound. The boron-treated chrome yellow pigments, when coated with dense, amorphous silica, are particularly useful for coloring high temperature molding plastics.

16 Claims, No Drawings

CHROME YELLOW PIGMENT WITH IMPROVED THERMAL STABILITY

BACKGROUND OF THE INVENTION

The term "chrome yellow pigment" as used herein refers to the pigments identified as Chrome Yellow CI-77600 and Lead Sulfochromate CI-77603 in the "Colour Index", second edition, 1956, published jointly by the Society of Dyers and Colourists, England and the American Association of Textile Chemists and Colorists, United States. These pigments are available in a broad range of shades. On the one hand there is the very green shade "Primrose Yellow" in rhombic crystal form. A relatively pure lead chromate in monoclinic crystal form is much redder and is commonly known as "Medium Yellow". Intermediate shades known as "Light Yellows" are available in solid solutions of lead chromate and lead sulfate usually in monoclinic form.

Chrome yellow pigments have been prepared by a variety of methods, most of which involve precipitation of the pigment from aqueous solutions of its constituent ion, i.e., lead, chromate and sulfate, in amounts varying according to the shade of pigment desired. Conventionally, an aqueous solution containing soluble salts of chromate and sulfate is mixed with a lead salt, in the form of an aqueous slurry or an aqueous solution, depending on the solubility of the lead salt. After precipitation, but prior to isolation, the chrome yellow pigment is commonly treated with a variety of hydrous oxides among which are hydrous oxides of aluminum, titanium, manganese, silicon, antimony and bismuth or mixtures thereof to provide a loose porous coating on the surface of the pigment to enhance pigmentary properties, such as lightfastness in paint compositions, as described, for example, in U.S. Pat. Nos. 2,212,917 and 2,808,339.

The major contribution toward color of chrome yellow pigment resides in the lead chromate component. Likewise, many of their shortcomings are also attributable to the properties inherent in the lead chromate component. Among these are (1) sensitivity to alkalies and acids, (2) staining in the presence of sulfides and (3) darkening on exposure to light or to elevated temperatures.

Early attempts to overcome these deficiencies have usually involved special treatment of the pigments designed either to provide a means of neutralizing the attacking agent and rendering it temporarily ineffective or to provide a barrier against the ready access thereof to the sensitive pigment particle. The claimed improvements, although very frequently demonstrable, have usually been only of academic interest in that their effectiveness has been short lived and not of sufficient duration to render possible the use of these pigments in many applications, particularly those applications where a high degree of thermal stability is required.

More recent and relatively successful attempts to overcome these deficiencies are described, for example, in U.S. Pat. Nos. 3,370,971 and 3,639,133. These patents describe coated lead chromate pigments, which are chemically resistant, lightfast and relatively thermally stable. The pigments therein described are prepared by applying a coating of dense, amorphous silica and optionally alumina to lead chromate pigment which has been precipitated and after-treated with hydrous oxide in a conventional manner. The dense silica-coated lead chromate pigments are described generally as resistant to darkening when heated to 300° to 320°C. In such plastics as polyethylene or polystyrene. A dense silica-coated chrome yellow pigment of the primrose type is described in Example 6 of U.S. Pat. No. 3,370,391 as quite resistant to darkening in polyethylene when extruded at 240° to 300°C. A dense silica-coated Medium Chrome yellow is described in Example 7 of that patent as showing only small color loss at 288°C. as compared to a conventional medium chrome yellow.

Although the dense silica-coated chrome yellow pigments do shown significant improvement in thermal stability when compared with uncoated pigment and gel-coated pigment known in the art, the resistance to darkening exhibited by these pigments at 300°–320°C. is low enough under many processing conditions to necessitate the use of temperatures from 30°–60°C. lower than the stated range to insure adequate color integrity. The resistance to darkening is further decreased in proportion to the length of time the pigment is exposed to elevated temperatures. For example, a pigment which retains color integrity when initially reaching an elevated temperature can darken considerably after being maintained at that temperature for several minutes.

The need to avoid elevated temperatures and extended exposure to elevated temperatures has a particularly adverse impact on the thermoplastics industry. In the thermoplastics industry pigmented thermoplastics are often held at the extrusion temperature for as long as 30 minutes prior to extrusion, during which time the pigment can significantly darken. In addition, the speed of further processing depends primarily on high temperature of the thermoplastic. In the processing of thermoplastics the use of temperatures even 30° below 300°C., not to mention 60°C. below, can decrease polymer flow and increase residence time of the polymer in the mold to the extent that process efficiency suffers and overall productivity decreases.

This invention provides for boron-treated chrome yellow pigment which, when coated with dense, amorphous silica, retains a significantly higher degree of color integrity at high temperatures than conventional dense silica-coated chrome yellow pigments, while retaining and, in some cases surpassing the degree of chemical resistance and lightfastness exhibited by the conventional chrome yellow pigments.

SUMMARY OF THE INVENTION

According to the invention there is provided an improvement in a process for preparing chrome yellow pigment in aqueous medium by contacting an aqueous solution containing soluble salts of chromate and sulfate with a salt of lead to form an aqueous slurry of said pigment and applying at least one hydrous metal oxide to the precipitated pigment. The improvement resides in adding from 0.2 to 18% by weight of a soluble boron compound, calculated as boric oxide and based on the weight of the final base pigment, to the aqueous medium. The phrase "final base pigment" as used herein refers to the boron-treated chrome yellow pigment with at least one hydrous metal oxide applied thereto. The boron compound utilized in this process is a water-soluble inorganic oxygen-containing boron compound which is capable of forming boric acid upon contact with aqueous media. For example, boric acid, boric oxide and acidified water-soluble borates, such an alkali metal borates in acidic solution are useful in the process of this invention.

To prepare boron-treated chrome yellow pigment of the light yellow type according to the invention, the boron can be added prior to precipitation of the pigment or can be added at any time after precipitation of the pigment, i.e., before, during or after the application of hydrous metal oxides to the precipitated pigment. Prior to precipitation, it is preferred that the boron compound be added to the aqueous solution containing dissolved chromate and sulfate to avoid any premature reaction with lead. For chrome yellow pigment of the light and medium types, it is preferred to add from 0.2 to 0.8% by weight of the boron compound, calculated at $B_2O_3$, prior to precipitation of the pigment. Although larger amounts of boron compound can be added prior to precipitation, amounts in excess of 0.8% by weight are not recommended because the color of the light and medium chrome yellow pigment may be altered. Addition of the boron compound after precipitation requires from 3 to 18% by weight of the boron compound, calculated as $B_2O_3$, to insure desirable properties, the best properties being obtained in the range of 6 to 12% by weight of the boron compound. Larger amounts of boron can be added after precipitation without adversely affecting product quality, but such excess amounts do not improve the product.

To prepare boron-treated chrome yellow pigment of the medium yellow type according to the invention, the boron compound should preferably be added after the precipitation of the pigment in the amounts and at the times described above for chrome yellow pigments of the light yellow type. To prepare boron-treated chrome yellow pigment of the primrose type according to the invention, the boron compound should preferably be added to the aqueous solution containing chromate and sulfate prior to precipitation of the pigment in an amount from about 7 to 12% by weight, calculated as $B_2O_3$. Amounts of boron compound less than about 7% by weight do not significantly improve properties of the pigment and amounts greater than about 12% by weight are not recommended because the color of the product may be altered.

The chrome yellow pigments of the invention contain as least one hydrous oxide and from 0.015 to 0.10% by weight of boron, calculated as $B_2O_3$ and based on the weight of the final base pigment. The amount of hydrous oxide is not critical to the practice of this invention, but total amounts from 0.5 to 3.0% by weight, calculated as metal oxide and based on the weight of the final base pigment, are preferred to provide an effective hydrous metal oxide coating which is not unnecessarily thick.

The boron-treated chrome yellow pigment of the invention is particularly useful as base pigment to which a coating of dense, amorphous silica and, optionally, alumina is applied according to procedures well-known in the art, e.g., U.S. Pat. No. 3,370,971. Although the pigments of the invention show at least comparable physical and chemical properties relative to untreated chrome yellow pigments, the significant improvement in chemical resistance and especially in thermal stability is exhibited when the pigments of the invention are coated with dense, amorphous silica. Compared to conventional chrome yellow pigments coated with dense, amorphous silica, the boron-treated chrome yellow pigments of the invention coated with dense, amorphous silica show a marked improvement in color integrity at temperatures as high as 320°C.

DETAILED DESCRIPTION OF THE INVENTION

The aqueous medium from which chrome yellow pigment is precipitated should contain salts of chromate and sulfate which are at least moderately soluble and preferably highly soluble in aqueous solution. The relative proportions of chromate and sulfate used depend on the shade of chrome yellow desired and are well-known to those skilled in the art. For example, a primrose shade usually requires from 40 to 85% by weight of lead chromate and 15 to 60% by weight of lead sulfate and a medium yellow shade usually requires at least 97% lead chromate. For reasons of high solubility, economy and availability alkali metal salts, particularly sodium salts, of chromate and sulfate are preferred. The lead salt is commonly mixed with the aqueous medium in the form of an aqueous slurry or aqueous solution depending on the solubility of the lead salt used. A commonly used insoluble lead salt is lead carbonate, often prepared just prior to reaction with chromate the sulfate by adding sodium carbonate to an aqueous solution of lead nitrate. Among the soluble lead salts useful in forming chrome yellow pigment are lead nitrate and lead acetate.

Because of the extremely low solubility of chrome yellow pigment in aqueous media, the pigment precipitates very rapidly from a solution of its constituent ions. Therefore, to have maximum control of the precipitation reaction, it is desirable to mix an aqueous solution of chromate and sulfate with a separate aqueous solution or slurry of lead salt. It is preferred that the mixing be done under conditions which promote rapid intimate contact of the two solutions.

The boron compound utilized in the process of the invention is most conveniently added to the aqueous medium in which the pigment is prepared in the form of an aqueous solution of the boron compound. A variety of soluble boron compounds are useful in this process, e.g., boric acid, boric oxide and acidified alkali metal borates. A major criterion for the boron compound, in addition to water-solubility, is that it be capable of forming boric acid in the aqueous solution in which the pigment is precipitated Whether the boron compound is added during or following precipitation of the pigment, it is essential that the pigment receive the conventional after-treatments with at least one hydrous metal oxide and preferably at least two hydrous metal oxides in order to achieve improved properties in the final pigment. No significant improvement in the properties of chrome yellow pigment is observed when the boron compound is employed alone, i.e., without application of at least one hydrous metal oxide. Among the hydrous metal oxides useful in the practice of the invention are hydrous metal oxides of aluminum, titanium, manganese, silicon, tin, hafnium, thorium, columbium, tantalum, antimony, bismuth and mixtures thereof. When more than one hydrous metal oxide is applied to the pigment it is preferred that hydrous aluminum oxide be one of the hydrous metal oxides chosen to insure the most significant improvement in the properties of the boron-treated pigment. The second oxide of choice preferred for use with hydrous aluminum oxide is hydrous titanium oxide.

It is not clear, at this time, exactly how the boron compound effects the improvements in hydrous metal oxide coated chrome yellow pigment. Electron micrographs of the pigments of the invention indicate a substantially continuous coating on the chrome yellow pigment particles, compared to a noncontinuous coating on pigment particles prepared without a boron compound. Whether the coating observed is composed of several layers or an intimate combination is not known. It is possible that a molecular monolayer of lead borate is formed on the chrome yellow pigment particles which improves the adhesion of the hydrous metal oxide coating or coatings applied after precipitation of the pigment. Although the role of the boron compound, which is at least partially in the form of boric acid in solution, in the compositions of the invention is not fully understood, it apparently facilitates the application of porous hydrous oxide to the chrome yellow pigment, which when coated with dense, amorphous silica exhibits much improved thermal stability.

In any event, the after-treatment with hydrous metal oxide which usually follows precipitation of the chrome yellow pigment can be applied in the conventional manner well-known to those skilled in the art, e.g., U.S. Pat. Nos. 2,212,917 and 2,808,339. The hydrous metal oxides can be applied to the pigment by adding water-soluble inorganic metal salts capable of forming the corresponding hydrous metal oxides in water to the aqueous slurry of pigment. Among the water soluble inorganic metal salts used are metal halides such as aluminum chloride and hydrated metal sulfate such as hydrated aluminum sulfate, titanyl sulfate and maganese sulfate.

As stated hereinabove, the significant improvement in the thermal stability of the chrome yellow pigment of the invention is achieved when a coating of dense, amorphous silica, and optionally alumina, is applied to the final base pigment. All of the commonly used, practical procedures for applying a dense silica coating to pigment involve using pigment which has been isolated from the aqueous slurry in which it was precipitated. The isolation procedure conventionally involves filtration, washing and, optionally, drying. For the boron-treated pigment prepared according to the invention, isolation prior to dense silica coating is preferred to achieve pigment having the highest thermal stability. The silica coating is preferably applied to the final base pigment in an amount from 2 to 40% by weight, based on the total weight of the dense silica-coated pigment, by a variety of conventional methods, such as described in U.S. Pat. Nos. 3,370,971 and 3,639,133.

In one method a dilute sodium silicate solution (about 3% by weight of $SiO_2$) is passed through a bed of cation exchange resin in the hydrogen form of sufficient capacity so that all of the sodium ion is removed to give a silicic acid effluent with a pH of 2.9–3.3. such a solution is only moderately stable, but will keep for several hours without gelation if maintained at a low temperature (close to 0°C.). A suitable amount of such a silicic acid solution is then added slowly (3–5 hours) to the alkaline pigment slurry at 90°–95°C. while maintaining the pH in the range of 9.0–9.5 by the periodic addition of increments of a dilute alkali such as NaOH solution. Obviously, the exact method of maintaining the pH in the desired range is not important and it could be done by maintaining the presence of a suitable buffer. Such a method would be subject, however, to the limitations imposed by the presence of sodium ion or other metallic ions, and the simple periodic addition of a suitable alkali has many points in its favor.

In another method equivalent amounts of a dilute sodium silicate solution (5.7% $SiO_2$) and a dilute sulfuric acid solution (3.18% $H_2SO_4$) are added simultaneously to the hot (± 95°C.) alkaline pigment slurry over a substantial period of time (3–5 hours) while maintaining the pH in the range of 9.0–10.0 by periodic addition of small amounts of dilute alkali (NaOH solution for instance). This is the preferred method of operation, and the variations mentioned earlier may easily be applied thereto. Thus, the pH may be allowed to go below 9.0, perhaps as low as 6.0 or 7.0, without completely destroying the desired effect; nevertheless, the results are better in the higher range. The reaction time can be reduced to as little as one hour without serious detriment. Although the temperature of reaction may be as low as about 60°C., this causes some tendency toward the formation of free $SiO_2$ in gel form; hence it is highly desirable to keep the temperature above at least 75°C. The exact concentrations of the solutions used are not important except that they should be relatively dilute and the amounts used should be essentially chemically equivalent.

A third method for applying a dense, amorphous silica coating to pigment involves adding all of the sodium silicate solution to the pigment slurry previously made alkaline, as with $NH_4OH$. This gives a pH of about 11.0, near the maximum permissible and, after heating the mixture to about 75°C., a 5% sulfuric acid solution is added slowly (1 to 1.5 hours) to give a final pH of about 7.8 to 8.0. An additional heating period up to about one hour is desirable in this procedure. The concentrations used and time of addition are not critical.

In each of these methods, the dense silica-coated product can be highly dispersed and difficult to filter with a considerable tendency for yield loss during the filtration and a tendency to result in hard products on drying. It is preferable, therefore, that a flocculation step be introduced. Such a step, although not necessary to the preparation of pigments of the desired characteristics, offers many advantages such as improved ease of filtration and washing, elimination of yield losses during filtration and improved texture of the resulting pigment. A variety of methods known in the art, such as those described in U.S. Pat. No. 3,370,971 are useful in isolating the dense silica-coated boron-treated pigment of this invention. A preferred method for facilitating isolation of the product is to add a polyvalent metal salt, especially an aluminum salt such as sodium aluminate, in aqueous solution, to the slurry of dense silica-coated pigment prior to isolation.

These methods of forming the silica layer on the surface of the lead chromate pigment particles have some feature in common, viz. that the silica is added as "active silica". When sodium silicate is acidified, silicic acid is formed, probably initially as orthosilicic acid, $Si(OH)_4$. However, this product tends to polymerize by the reaction of two silanol groups

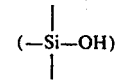

to form a siloxane group

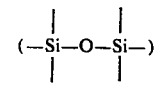

Under acidic conditions, this polymerization proceeds rapidly until a predominant proportion of the silanol groups present have been used up in the formation of siloxane bonds. The polymer thus formed has a high molecular weight and is defined as "inactive". Under the conditions of moderate alkalinity used in the examples below, there is a low degree of polymerization wherein the condensation between silanol groups has proceeded to only a limited extent leaving the silica in an "active" form which readily deposits on the surface of the pigment particles present. It is not intended to imply that there is no polymerization nor that the process of polymerization is completely inhibited but, under the conditions specified, the silica is in a state of low polymerization and, thus "active", for a sufficient time to bring about deposition in the dense, amorphous form on the surface of the pigment particles.

The quantity of silica to be applied in the pigment coating can vary over a considerable range depending on the intended end use of the pigment. For use in extruded hot thermoplastic resins from 15 to 32% by weight of silica is desirable, and amounts up to about 40% by weight can be used without adversely affecting pigment color. In applications where extremely high thermal stability is not required, amounts of silica as low as 2% by weight provide improved chemical resistance and lightfastness. Thus, for purposes of this invention the dense, amorphous silica coating can be in the range of about 2 to 40% by weight of the final dense silica-coated pigment. When alumina is also present the quantity of $Al_2O_3$ can be varied from 0.25 to 2% by weight of the final pigment.

PREFERRED EMBODIMENTS

In one embodiment of the invention boron-treated chrome yellow pigment of the light yellow type is prepared by contacting a first aqueous solution containing a mixture of dissolved sodium salts of chromate and sulfate at a pH from 11 to 13 with a second aqueous solution containing dissolved lead nitrate at a ph from 3 to 4 to precipitate the pigment. The resulting pigment slurry is stirred for several minutes at elevated temperature, e.g., 95°C. to facilitate crystal growth, commonly known as development. After development an aqueous solution of hydrated aluminum sulfate is added to the slurry. Then from 3 to 18% by weight of boric oxide, and preferably from 6 to 12% by weight of boric oxide, based on the weight of the final base pigment is added to the slurry as an aqueous solution. After a few minutes of stirring an aqueous solution of titanyl sulfate is added to the slurry. The pH of the slurry is adjusted to from about 5 to 6. The boron-treated chrome yellow pigment is then isolated from the slurry by filtration, washed with water and dried.

In another embodiment of the invention, boron-treated chrome yellow pigment of the light yellow type is prepared by contacting an aqueous lead nitrate solution as described above with an aqueous solution containing in addition to the sodium salts listed above from 0.2 to 0.8% by weight of boric oxide on a dry basis, based on the weight of the final base pigment. The resulting pigment slurry is treated with silica and alumina and the final product is isolated as described above.

An embodiment of the invention for preparing chrome yellow pigment of the medium yellow type is practiced by contacting a first aqueous solution containing a mixture of dissolved sodium salts of chromate and sulfate, in amounts such that sulfate is present in less than about 3% by weight of the total salts, as a pH from 7 to 8 with a second aqueous solution containing dissolved lead nitrate at a pH from 3 to 4 to precipitate the pigment. The resulting pigment is held at elevated temperature for several minutes to facilitate crystal growth, then additional lead nitrate in aqueous solution is added to the slurry in excess to react with any excess chromate which may remain after inititial precipitation. Then from an aqueous solution of boric oxide is added to the slurry in an amount from 3 to 18% by weight, and preferably from 6 to 12% by weight, based on the weight of the final base pigment, after which an aqueous solution of hydrated aluminum sulfate is added to the slurry. An aqueous solution of titanyl sulfate is then added to the slurry. The pH of the slurry is adjusted to between 5 and 6 and the product is isolated in the conventional manner described above.

An embodiment of the invention for preparing chrome yellow of the primrose type is practiced by contacting a first aqueous solution at a pH between about 1 and 2 containing dissolved sodium salts of chromate and sulfate, hydrated aluminum sulfate and boric oxide in an amount from 7 to 12% by weight, and preferably about 10% by weight, based on the weight of the final base pigment, with a slurry of lead carbonate prepared by adding sodium carbonate to an aqueous solution of lead nitrate. The resulting pigment slurry is held at elevated temperature for several minutes to facilitate crystal growth. Then separate aqueous solutions of manganese sulfate and hydrated aluminum sulfate, respectively, are added to the slurry. The pH is adjusted to from 4.5–5.5 and the slurry is heated to an elevated temperature and maintained at that temperature for several minutes. The product is then isolated in the manner described above.

The following examples are intended to illustrate the invention. The term "parts" as used herein refers to parts by weight. The physical and chemical properties of all exemplified pigments are determined according to the procedures described in Example 1.

EXAMPLE 1

Chrome Yellow Pigment of Light Yellow Type Treated with 4% Boric Oxide

Solution A is prepared by dissolving 441.64 parts of $Pb(NO_3)_2$ in 2400 parts of water at a temperature of 80°F. (27°C.) and the pH is adjusted to 3.2. Solution B is prepared by dissolving 142.7 parts of $Na_2Cr_2O_7·2H_2O$, 36.0 parts of $Na_2SO_4$ and 4.15 parts of $NaHF_2$ in 1520 parts of water, and the pH is adjusted to 12.1–12.3 at a temperature of 80°F. (27°C.).

To precipitate the pigment, Solution B is added to Solution A over a period of about 40 seconds with agitation. The resulting slurry is heated to 205°F. (96°C.) and maintained at that temperature for 15 minutes. Then an aqueous solution containing 40.0 parts of hydrated aluminum sulfate (equivalent to 56.1% $Al_2(SO_4)_2$ or 17.1% of $Al_2O_3$) is added to the slurry, after which the slurry is stirred for five minutes. An aqueous solution containing 18 parts of boric oxide (4% by weight, based on the weight of the final base pigment) is then added to the slurry. After 5 minutes of additional stirring, an aqueous solution of titanyl sulfate in an amount equivalent to 6.49 parts of titanium dioxide is added to the slurry with stirring. The pH is adjusted to 5.0 with an aqueous solution of sodium carbonate. The resulting brilliant chrome yellow pigment of light yellow shade is isolated from the slurry in the conventional manner by filtration, washing and drying.

Electron micrographs of the boron-treated chrome yellow pigment show a substantially continuous outer coating. Electron micrographs of a conventional chrome yellow pigment prepared in the identical manner, except for the omission of the boric oxide, show a discontinuous, flaky coating.

When the boron-treated chrome yellow pigment and the conventional chrome yellow pigment are separately dispersed in a conventional alkyd coating composition vehicle and panels coated with the resulting composition are exposed to light, a similar degree of lightfastness is observed. When similar panels are exposed to a 10% aqueous solution of sodium hydroxide and a 1% aqueous solution of sodium sulfide, respectively, the boron-treated chrome yellow pigment and the conventional chrome yellow pigment exhibit comparable resistance to spotting and color loss.

To test for resistance to darkening in thermoplastic at high temperatures the boron-treated chrome yellow pigment and the conventional chrome yellow pigment are separately mixed with solid granular polystyrene and subjected to can rolling for ten minutes, according to the method described in U.S. Pat. No. 3,639,133, then two-roll milled (0.016 inch clearance) into sheets. The sheets are cut and placed in an extruder at temperatures ranging from 204° to about 320°C. Prior to extrusion the hot polystyrene is maintained at temperature for 20 minutes. When the polystyrene is extruded, the polystyrene containing the boron-treated chrome yellow shows resistance to darkening from 204° to about 320°C. similar to the polystyrene containing the conventional chrome yellow pigment.

EXAMPLE 2

Dense Silica-Coated Chrome Yellow Pigment of Light Yellow Type Treated with 4% Boric Oxide A paste is prepared by mixing 150 parts of the boron-treated pigment prepared according to the procedure of Example 1, 20 parts of the sodium silicate (29.5% of $SiO_2$, $SiO_2/Na_2O$ = 3.25, such as Du Pont Technical Grade No. 9) and 447 parts of water. The mixture is further diluted with 790 parts of water for a total of about 1237 parts of water. The pH of the resulting slurry is then adjusted to 11.5 with a 5% aqueous solution of sodium hydroxide and the resulting pigment slurry in heated to 90°C.

In separate containers the following solutions are prepared:

1. 115 Parts of the above-described sodium silicate is added to 530 parts of water,
2. 17.3 Parts of 96.0% sulfuric acid is added to 800 parts of water.

These solutions are then added simultaneously to the pigment slurry prepared above over a period of three hours for solution (1) and 3¾ hours for solution (2), while maintaining the temperature at 90°–95°C. throughout the addition. After completion of the addition of solutions (1) and (2), an aqueous solution containing 10.0 parts of aluminum sulfate in 100 parts of water is added to the slurry. The slurry is stirred for five minutes and the pH is adjusted to 4.0–4.12 with 5% aqueous solution of sodium hydroxide. The product is then filtered, washed with water to a resistance of 5,000 ohms and dried overnight at 220°F. (100.4°C.) to give a silica-coated chrome yellow pigment of the light yellow type having superior properties.

When tested for lightfastness and chemical resistance in the manner described in Example 1, the dense silica-coated chrome yellow pigment treated with boric oxide shows comparable lightfastness and chemical resistance relative to a conventional dense silica-coated molybdate orange pigment prepared in the identical manner, except for the omission of the boric oxide.

When mixed with polystyrene and extruded at high temperatures in the manner described in Example 1, the polystyrene containing the dense silica-coated chrome yellow pigment treated with boron shows substantially no darkening at temperatures up to about 280°C. and only very slight darkening at 320°C. By comparison the polystyrene containing the conventional dense silica-coated chrome yellow pigment begins to darken at 278°C. and exhibits significant darkening at 320°C.

EXAMPLE 3

Chrome Yellow Pigment of the Light Yellow Type Treated with 8% $B_2O_3$

The procedure of Example 1 is followed, except that 36.0 parts of boric oxide (8% by weight, based on the weight of the final base pigment) is used.

Lightfastness, chemical resistance and thermal stability of the resulting pigment are similar to those of the boron-treated pigment described in Example 1.

EXAMPLE 4

Dense Silica-Coated Chrome Yellow Pigment of the Light Yellow Type Treated with 8% Boric Oxide The procedure of Example 2 is followed, except that 150 parts of the chrome yellow pigment of Example 3 is used.

Lightfastness, chemical resistance and thermal stability of the resulting dense silica-coated pigment are similar to those of the boron-treated dense silica-coated pigment described in Example 2.

EXAMPLE 5

Chrome Yellow Pigment of the Light Yellow Type Treated with 12% $B_2O_3$

The procedure of Example 1 is followed except 54.0 parts of boric oxide (12% by weight, based on the weight of the final base pigment) is used.

Lightfastness, chemical resistance and thermal stability of the resulting pigment are similar to those of the boron-treated pigment described in Example 1.

EXAMPLE 6

Dense Silica-Coated Chrome Yellow Pigment of the Light Yellow Type Treated with 12% Boric Oxide The procedure of Example 2 is followed, except 150 parts of the chrome yellow pigment of Example 5 is used.

Lightfastness, chemical resistance and thermal stability of the resulting dense silica-coated pigment are similar to those of the boron-treated dense silica-coated pigment described in Example 2.

EXAMPLE 7

Chrome Yellow Pigment of the Light Yellow Type Treated with 0.8% $B_2O_3$

Solution A is prepared by dissolving 441.64 parts of $Pb(NO_3)_2$ in 1510 parts of water at a temperature of 80°F. (27°C.) and the pH is adjusted to 3.2. Solution B is prepared by dissolving 142.7 parts of $Na_2Cr_2O_7 \cdot 2H_2O$, 21.8 parts of $Na_2SO_4$, 3.07 parts of $NaHF_2$ and 3.50 parts of $B_2O_3$ (0.8% by weight based on the weight of the final base pigment) in 1520 parts of water at 80°F. (27°C.) and the pH is adjusted to 12.1–12.3.

To precipitate the pigment, Solution B is added over a period of about 40 seconds with agitation. The resulting slurry is heated to 205°F. (96°C.) and maintained at that temperature for 15 minutes. Then an aqueous solution containing 30.3 parts of the hydrated aluminum sulfate described in Example 1 is added to the slurry after which the slurry is stirred for five minutes. An aqueous solution of titanyl sulfate in an amount equivalent to 6.44 parts of $TiO_2$ is then added to the slurry. After stirring for ten seconds, the slurry pH is adjusted to 5.1 with an aqueous solution of sodium carbonate. The resulting brilliant chrome pigment of light yellow shade is isolated from the slurry in the conventional manner by filtration, washing and drying. Upon analysis and evaluation as described in Example 1, this pigment is found to have lightfastness, chemical resistance, and thermal stability similar to the light yellow chrome yellow pigment, treated with boric oxide after precipitation, described in Example 1.

EXAMPLE 8

Dense Silica-Coated Chrome Yellow Pigment of the Light Yellow Type Treated with 0.8% $B_2O_3$ The procedure of Example 2 is followed, except that 150 parts of the chrome yellow pigment of Example 7 is used.

The lightfastness, chemical resistance, and thermal stability of the resulting dense silica-coated pigment are similar to those of the dense silica-coated pigment treated with boric oxide after precipitation described in Example 2.

EXAMPLE 9

Chrome Yellow Pigment of the Light Yellow Type Treated with 0.2% $B_2O_3$

The procedure of Example 7 is followed except that 22.3 parts of $Na_2SO_4$ and 0.87 parts of boric oxide (0.2% by weight based on the weight of the final base pigment) is used.

The lightfastness, chemical resistance, and thermal stability of the resulting chrome yellow pigment are similar to those of the chrome yellow pigment treated with boric oxide after precipitation described in Example 1.

EXAMPLE 10

Dense Silica-Coated Chrome Yellow Pigment of the Light Yellow Type Treated with 0.2% $B_2O_3$ The procedure of Example 2 is followed, except that 150 parts of the chrome yellow pigment of Example 9 is used.

The lightfastness, chemical resistance, and thermal stability of the resulting dense silica-coated pigment are similar to those of the dense silica-coated pigment treated with boric oxide after precipitation described in Example 2.

EXAMPLE 11

Chrome Yellow Pigment of the Light Yellow Type Treated with 0.4% $B_2O_3$

The procedure of Example 7 is followed except that 139.15 parts of $Na_2Cr_2O_7 \cdot 2H_2O$, 27.92 parts of $Na_2SO_4$ and 1.75 parts of $B_2O_3$ (0.4% by weight based on the weight of the final pigment) is used.

The lightfastness, chemical resistance, and thermal stability of the resulting chrome yellow pigment are similar to those of the chrome yellow pigment treated with boric oxide after precipitation described in Example 1.

EXAMPLE 12

Dense Silica-Coated Chrome Yellow Pigment of the Light Yellow Type Treated with 0.4% $B_2O_3$ The procedure of Example 2 is followed, except 150 parts of the chrome yellow pigment of Example 11 is used.

Lightfastness, chemical resistance and thermal stability of the resulting dense silica-coated pigment are similar to those of the boron-treated dense silica-coated pigment described in Example 2.

EXAMPLE 13

Chrome Yellow Pigment of the Medium yellow Type Treated with 6% $B_2O_3$

Solution A is prepared by dissolving 331.0 parts of $Pb(NO_3)_2$ in 1790 parts of water at 80°F. (27°C.) and the pH is adjusted to 3.3. Solution B is prepared by dissolving 154.0 parts of $Na_2Cr_2O_7 \cdot 2H_2O$, 4.3 parts of $Na_2SO_4$ and 1.54 parts of $NaHF_2$ in 1790 parts of water at 80°F. (27°C.) and the pH is adjusted to 7.6.

Solution A is added to Solution B over a period of 40 seconds. The resulting slurry is heated to 180°F. (82°C.) and maintained at that temperature for 20 minutes. An additional 34.0 parts of $Pb(NO_3)_2$ in aqueous solution is then added to the slurry. immediately thereafter an aqueous solution containing 22.0 parts of boric oxide (6% by weight based on the weight of the final base pigment) is added to the slurry. Then an aqueous solution containing 48.0 parts of the hydrated aluminum sulfate described in Example 1 is added to the slurry. After 1 minute of stirring an aqueous solution of titanyl sulfate in an amount equivalent to 6.8 parts of titanium dioxide is added to the slurry. The slurry is stirred for 10 seconds and the pH is adjusted to 5.6. A brilliant chrome yellow pigment of medium yellow shade is isolated in the conventional manner by filtration, washing and drying.

The color and lightfastness of this chrome yellow pigment are similar to those of a conventional chrome yellow pigment, prepared in the identical manner except for the omission of the boric oxide. The chemical resistance and thermal stability of this chrome yellow pigment are similar to those of the chrome yellow pigment described in Example 1.

EXAMPLE 14

Dense Silica-Coated Chrome Yellow Pigment of the Medium Yellow Type Treated with 6% $B_2O_3$ The procedure of Example 2 is followed except that 150 parts of the chrome yellow pigment of Example 13 is used.

The color and lightfastness of this dense silica-coated chrome yellow pigment are similar to those of a conventional dense silica-coated chrome yellow pigment prepared in an identical manner except for the omission of the boric oxide. Chemical resistance and thermal stability of the resulting dense silica-coated pigment are similar to those of the boron-treated dense silica-coated pigment described in Example 2.

EXAMPLE 15

Chrome Yellow Pigment of the Medium Yellow Type Treated with 12% $B_2O_3$

The procedure of Example 13 is followed except 44.0 parts of boric oxide (12% by weight, based on the weight of the final base pigment) is used.

The lightfastness, chemical resistance, and thermal stability of the resulting pigment are similar to those of the boron-treated chrome yellow pigment described in Example 13.

EXAMPLE 16

Dense Silica-Coated Chrome Yellow Pigment of the Medium Yellow Type Treated with 12% $B_2O_3$ The procedure of Example 2 is followed, except that 150 parts of the chrome yellow pigment of Example 15 is used.

The lightfastness, chemical resistance, and thermal stability of the resulting dense silica-coated pigment are similar to those of the boron-treated dense silica-coated pigment described in Example 14.

EXAMPLE 17

Chrome Yellow Pigment of the Medium Yellow Type Treated with 18% $B_2O_3$

The procedure of Example 13 is followed except that 66.0 parts of boric oxide (18% by weight, based on the weight of the final base pigment) is used.

The lightfastness, chemical resistance, and thermal stability of the resulting pigment are similar to those of the boron-treated chrome yellow pigment described in Example 13.

EXAMPLE 18

Dense Silica-Coated Chrome Yellow Pigment of the Medium Yellow Type Treated with 18% $B_2O_3$ The procedure of Example 2 is followed, except that 150 parts of the chrome yellow pigment of Example 17 is used.

The lightfastness, chemical resistance, and thermal stability of the resulting dense silica-coated pigment are similar to those of the boron-treated dense silica-coated pigment described in Example 14.

EXAMPLE 19

Chrome Yellow Pigment of the Primrose Type Treated with 10% $B_2O_3$

Solution A is prepared by dissolving 331.2 parts of $Pb(NO_3)_2$ in 2690 parts of water at 80°F. (27°C.) and the pH is adjusted to 4.1. An aqueous solution of 46.7 parts of $Na_2CO_3$ in 200 parts of water is added to solution A to form an aqueous slurry of lead carbonate.

Solution B is prepared by dissolving 106.7 parts of $Na_2Cr_2O_7 \cdot 2H_2O$, 10.7 parts of $Na_2SO_4$, 2.46 parts of $NaHF_2$, 3.97 parts of concentrated $H_2SO_4$, 12.0 parts of the hydrated aluminum sulfate described in Example 1, and 32.0 parts of boric oxide (10% by weight, based on the weight of the final base pigment) in 2910 parts of water at 80°F. (27°C.). The pH of the solution is adjusted to 1.85 with a 5% by weight aqueous solution of nitric acid.

To precipitate the pigment, Solution B is added to the previously prepared aqueous slurry of lead carbonate over a period of 40 seconds and the resulting slurry is stirred for five minutes. At intervals of 30 seconds the following solutions are added to the resulting slurry:

10.3 parts of $Na_2SO_4$ in 100 parts of water.
10.96 parts of $Na_2CO_3$ in 100 parts of water.
4.1 parts of $Na_4P_2O_7$ in 200 parts of water.

After addition of the above-described solutions, the slurry is heated to 180°F. (82°C.) and maintained at that temperature for 15 minutes.

Then at intervals of 30 seconds the following solutions are added to the slurry:

2.08 parts of $MnSO_4$ in 100 parts of water.
48.1 parts of the hydrated aluminum sulfate described in Example 1 in 100 parts of water.
5.20 parts of $Na_4P_2O_7$ in 250 parts of water.

The pH of the resulting slurry is adjusted to 5.0–5.1, after which the slurry is heated to 190°F. (88°C.) and maintained at that temperature for 20 minutes.

The resulting brilliant chrome yellow pigment of the primrose type is isolated and tested in the manner described in Example 1.

The color and lightfastness of this pigment are similar to those of a conventional chrome yellow pigment, prepared in an identical manner except for the omission of the boric oxide. Chemical resistance and thermal stability of this pigment are similar to those of the boron-treated chrome yellow pigment described in Example 1.

EXAMPLE 20

Dense Silica-Coated Chrome Yellow Pigment of the Primrose Type Treated with 10% $B_2O_3$ The procedure of Example 2 is followed, except that 150 parts of the chrome yellow pigment of Example 19 is used.

The color and lightfastness of this dense silica-coated chrome yellow pigment are similar to those of a conventional dense silica-coated chrome yellow pigment prepared in an identical manner except for the omission of the boric oxide. The chemical resistance and thermal stability of the resulting dense silica-coated pigment are similar to those of the boron-treated dense silica-coated pigment described in Example 2.

What is claimed is:

1. In a process for preparing chrome yellow pigment in aqueous medium by contacting an aqueous solution containing soluble salts of chromate and sulfate with a salt of lead to form an aqueous slurry of said pigment and applying at least one hydrous metal oxide to the precipitated pigment, wherein the improvement comprises adding from 0.2 to 18% by weight of a soluble boron compound to said aqueous medium.

2. Process for preparing chrome yellow pigment according to claim 1 wherein said boron compound is a water-soluble inorganic oxygen-containing boron compound which forms boric acid upon contact with aqueous media.

3. Process for preparing chrome yellow pigment according to claim 2 wherein said boron compound is selected from the group consisting of boric oxide, boric acid and acidified alkali metal borates.

4. Process for preparing chrome yellow pigment according to claim 2 wherein said hydrous metal oxide is at least one hydrous oxide selected from the group consisting of the hydrous oxide of aluminum, titanium, manganese, silicon, tin, hafnium, thorium, columbium, tantalum, antimony and bismuth.

5. Process for preparing chrome yellow pigment according to claim 4 wherein at least one hydrous oxide is aluminum hydrous oxide.

6. Process for preparing chrome yellow pigment according to claim 2 wherein a coating of dense, amorphous silica is applied to said chrome yellow pigment, in an amount from 2 to 40% by weight, calculated as $SiO_2$ and based on the weight of the dense silica-coated pigment.

7. Process for preparing chrome yellow pigment according to claim 2 wherein said chrome yellow pigment is the light yellow type.

8. Process for perparing chrome yellow pigment according to claim 7 wherein said boron compound is added to said aqueous solution in an amount from 0.2 to 0.8% by weight.

9. Process for preparing chrome yellow pigment according to claim 7 wherein said boron compound is added to said aqueous slurry of precipitated pigment in an amount from 3 to 18% by weight.

10. Process for preparing chrome yellow pigment according to claim 2 wherein said chrome yellow pigment is the medium yellow type and said boron compound is added to said aqueous slurry of precipitated pigment in an amount from 3 to 18% by weight.

11. Process for preparing chrome yellow pigment according to claim 2 wherein said chrome yellow pigment is the primrose type and said boron compound is added to said aqueous solution in an amount from 7 to 12% by weight.

12. Chrome yellow pigment prepared according to the process of claim 2.

13. Chrome yellow pigment prepared according to the process of claim 6.

14. Chrome yellow pigment containing at least one hydrous metal oxide selected from the group consisting of the hydrous oxides of aluminum, titanium, manganese, silicon, tin, hafnium, thorium, niobium, tantalum, antimony, and bismuth and from 0.015 to 0.10% by weight of boron, calculated as $B_2O_3$.

15. Chrome yellow pigment according to claim 14 wherein said hydrous metal oxide is present in an amount from 0.5 to 3.0% by weight, calculated as the metal oxide.

16. Chrome yellow pigment according to claim 15 having a coating of dense, amorphous silica in an amount from 2 to 40% by weight.

* * * * *